Sept. 28, 1937.    P. HEMPEL    2,094,236
SPECTACLE FRAME
Filed March 30, 1934    2 Sheets-Sheet 2
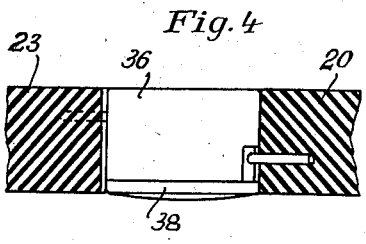
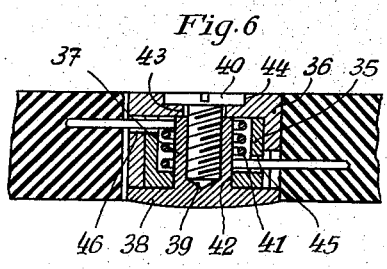
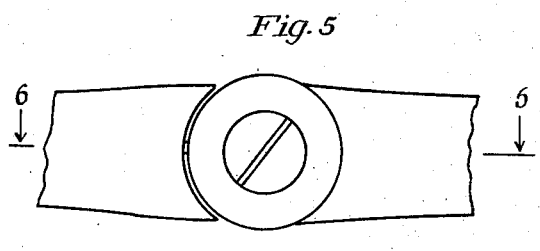
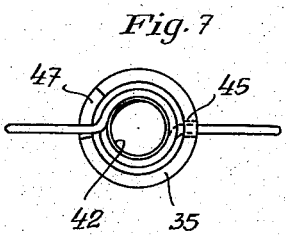
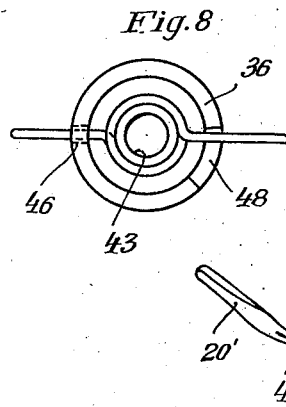
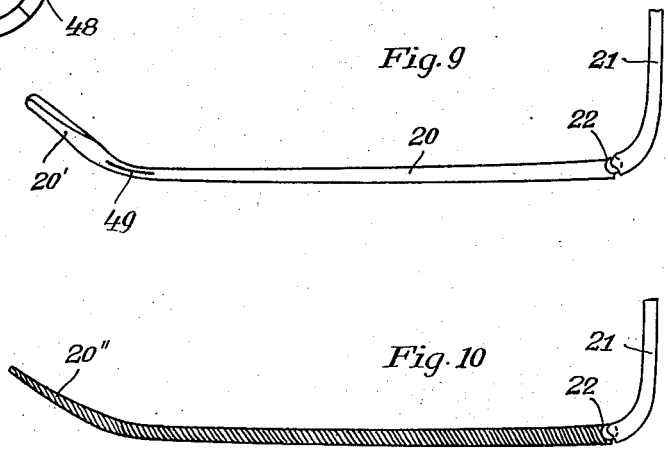
Paul Hempel
INVENTOR
By Otto Munk
his ATTY.

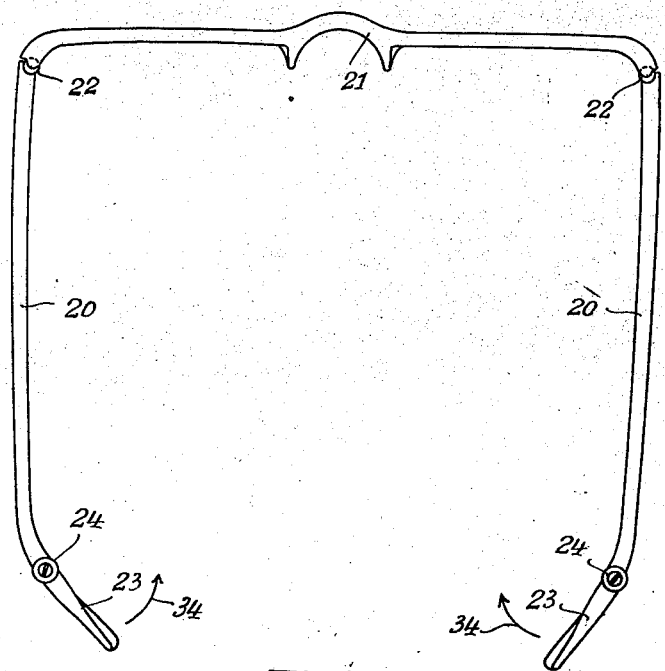
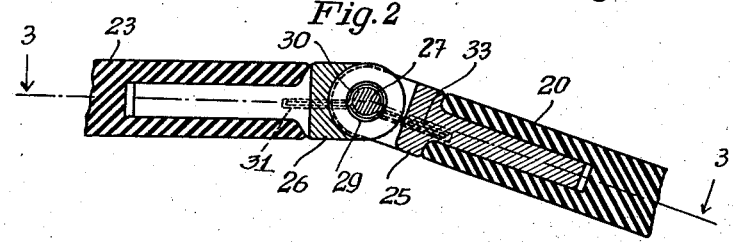
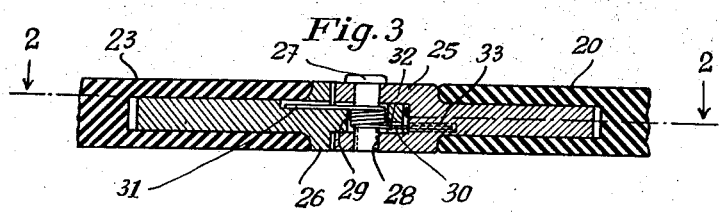

Patented Sept. 28, 1937

2,094,236

UNITED STATES PATENT OFFICE 2,094,236

SPECTACLE FRAME

Paul Hempel, Koeln-on-the-Rhine, Germany

Application March 30, 1934, Serial No. 718,130
In Germany April 5, 1933

5 Claims. (Cl. 88—52)

This invention relates to improvements in spectacle frames.

The spectacle frames of the types hitherto customarily used comprise the lens rims, nose piece and templets jointed to said lens rims, except in the case of the so-called "rimless" spectacles, in which case, as is usual, the templets are pivoted to a bracket or clamp engaging or attached to the outer end of the lens. The templets of the spectacle frame rest on the shell of the ear. This particular part of the ear not being a fleshy part the resting on it of the sides causes a disagreeable feeling in cold weather, while in warm or hot weather the skin of the ear shell becomes soft at the points where it comes into contact with the sides by reason of the perspiration occurring and this may quite easily cause painful inflammation of the skin. In the case of another known embodiment of spectacle frames, where the templet embraces a part of the ear shell, i. e. partly encircles it, so as to obtain a reliable and secure hold or fit, there is always a certain amount of pull present from the nose towards the back of the head, which pull is the cause of a disagreeable pressure being exerted both on the bridge of the nose, as well as behind the ears. Moreover this type of templet is easily deformed by reason of its frequent handling and of changes in temperature, and the result of such deformations is that the firm hold of the spectacles is jeopardized. Further the faculty of vision is very deleteriously affected by the altered fit of the spectacles due to the above mentioned deformations of the templets. When such hook or looped templets fit loosely, the spectacles are very easily moved or displaced, a fact which makes itself very disagreeably felt by the wearer. In the case where spectacles having so-called straight or push templets are used, the above mentioned defect makes itself disagreeably felt by the wearer, because of the fact, that the spectacles are adapted to a forward movement and the templets after short usage bend outwardly, thus loosening the hold of the spectacles, so that the latter tend to slide forwardly over the nose and to drop off. Therefore, the spectacle frames of the types hitherto customarily used are provided with certain defects which make them awkward and disagreeable for the wearer to use.

One object of the present invention is to provide a spectacle frame, which prevents any disagreeable pressure while it assures a proper hold in the desired position.

Another object of the invention is to provide a spectacle frame which ensures, upon application, not to ensnare the hair of the user when the frames are being put on or taken off. Thus according to the present invention I provide a spectacle frame comprising a centre or nose piece, lens rims and two rigid templets each thereof being jointed to said rims and having two short arms or extensions each thereof being resiliently articulated to the end of said templet so as to insure a proper holding position at the back of the head of the wearer. The said holding position is properly present in the fossa, which is limited at the top by the ear extension of the arcus zygmaticus behind the porous acousticus and at the bottom by the processus mastoideus; this holding position described is slight and the part engaged is quite insensible to pressure. Furthermore the two templets jointed to the middle part come only very lightly or not at all into contact with the sides of the head, whereby any disagreeable pressure in the direction of temples is completely eliminated.

Moreover according to the invention a hinge is arranged between each of said short legs and said templets, which hinge completely encloses the spring causing the pressing of the leg against the holding point on the head. Thus the spring is protected from the influence of the weather and furthermore the arrangement ensures that no hairs become inadvertently tangled when putting on the spectacles or when they are removed.

These and further objects and advantages will be apparent from the annexed drawings taken in connection with the description and in which:

Fig. 1 is a top plan view of a spectacle frame;

Fig. 2 is a fragmentary longitudinal section through the two members of the templets taken on lines 2—2 of Fig. 3;

Fig. 3 is a fragmentary longitudinal section through the two members of the templets taken on lines 3—3 of Fig. 2;

Fig. 4 is a view in elevation of further embodiment of the hinge connection between the templet and the extension;

Fig. 5 is a top plan view of the hinge according to Figure 4;

Fig. 6 is a longitudinal section through the hinge taken on lines 6—6 of Fig. 5;

Fig. 7 is a view of the lower casing of the hinge;

Fig. 8 is a view of the upper casing of the hinge;

Fig. 9 is a plan view of a still further embodiment of the invention.

Fig. 10 is a plan view of still another embodiment of the invention.

Referring to the drawings, 21 denotes the nose piece and lens rims of a spectacle frame, the outer sides of the rims or other lens engaging means being provided with hinge connections 22 which carry rigid templets 20. The outer or free ends of the templets 20 are each provided with an arm or extension 23 adapted to resiliently engage the head of the wearer just back of the ear, and within the depression described above.

The arm 23 may be hinged to the templet by means of a construction 24 consisting of a yoke-shaped projection 25 at the end of the templet and a tongue projection 26 at the inner end of the arm accommodated between the arms of the yoke. The arms of the yoke 25 are provided with alined openings 28 to accommodate a pin 27 which projects through an opening 29 in the tongue, the opening thereof being somewhat larger than the pin 27 to accommodate the coils of a helical spring 30 which embraces the pin and has one end engaged in a slot 31 in the tongue 26 and the other end projected through a slot 32 in the tongue 26 and into an opening 33 in yoke 25. Therefore the arm 23 at all times is urged in the direction of the arrow 34 and against the back of the head and into the fossa above mentioned and naturally present therein, said fossa forming the only holding point for the frame templets, thus ensuring a secure fit of the spectacle without any disagreeable pressure being felt. Any hair getting into the hinge which would be torn out when taking the spectacles off is effectively avoided by the above described arrangement of the spring in the interior of the hinge.

Means may be arranged or used if desired for regulating the tension of the spring.

The Figures 4-8 show another embodiment of the hinge connecting the templet 20 to the leg 23. In this case the hinge comprises an upper casing 36 mounted on the templet 20, a lower casing 35 inserted in the upper casing 36, a bolt 37 provided with a head or cap 38 and a threaded bore 39, a cap screw 40 and a spring 41. The lower casing 35 is provided with a hole 42 to receive the bolt 37, while the upper casing 36 is provided with a hole 43 and depression 44 to receive the cap screw 40. Furthermore the side wall of the lower casing is provided with a hole 45 and the side wall of the upper casing with a hole 46. On the rim of each casing is arranged a slot-like depression 47, 48 adjacent to the holes 46 and 45 respectively. To assemble, the helical spring will be inserted in the lower casing 35. One end of the spring is introduced through the hole 46 of the upper casing 36 in a bore of the arm 23, the other end of the spring is introduced through the hole 45 of the lower casing 35 and the slot 48 of the upper casing 36 into a bore of the templet 20, thus assuring the fastening of the hinge to the members 20 and 23. Then the bolt 37 and the screw 40 are put in the hole 42 and 43 and screwed together. The helical spring 41 surrounds the bolt and is completely covered by the casings; the head 38 and the cap screw moreover tighten the casing. The depressions 47 and 48 limit the angular movement of the two hinge members. In the same manner as in the embodiment according to the Figs. 2 and 3 the spring causes a pressing of the arm against the back of the head of the wearer.

From the foregoing it is clear that an important object of the invention is that the templets are jointed to the rims or other lens engaging member without any elasticity and that the extremity only of the templets or of the prolonged templets is resiliently pressed against the head. This result can be obtained also in the embodiment of the Fig. 9. In this case one end of the templet 20 is jointed to the rim 21 by the hinge 22. Near the other end the templet is weakened and a spring 49, i. e. a plate-spring, is inserted. Therefore, the part 20' is resilient and tends to press against the back of the head with the same result as that of the resiliently articulated arms of the spectacle frame above mentioned.

As illustrated in Figure 10, the templet of a spectacle frame consists of a coiled filament, only the extremities 20" of said templets being yieldable and capable of bending inward, if desired, while the other parts of the spectacle frame are rigid. The extremities 20" are the same in effect as the arms 23 above described and press against the back of the head of the wearer.

The invention may be embodied also in other specific forms without departing from the spirit or essential characteristics thereof.

Having now particularly described and ascertained the nature of my invention and in what manner the same is to be performed, I declare that what I claim is:

1. In a spectacle, in combination, a nose piece, lenses, templet attaching means associated with said lenses and two relatively stiff main templet members each articulated to said templet attaching means and arranged to extend backwardly over the ear of the wearer, and two short templet extension members carried upon the free ends of the said main templet members and biased toward each other, said templet extension members being of such length that the free ends thereof bear within the fossa which is limited at the top by the ear extension of the arcus zygmaticus behind the porous acousticus and at the bottom by the processus mastoideus.

2. A templet for spectacles, comprising a relatively stiff main templet member, one end of which is provided with means for attaching it to a lens engaging means and the other end of which is adapted to extend backwardly over the ear of the wearer, and a short templet extension member carried upon the rear free end of said main templet member in such a manner that in use it is biased toward the head of the wearer, said extension member being so constructed and arranged that the free end thereof is pressed into the fossa which is limited at the top by the ear extension of the arcus zygmaticus behind the porous acousticus and at the bottom by the processus mastoideus.

3. A templet for spectacles, one end of which is provided with means for attaching it to a lens engaging means, an intermediate main portion of which is arranged to extend over the ear of the wearer and the rear free end of which is connected by means of a hinge to said main portion and is of such a length that it bears within the fossa which is limited at the top by the ear extension of the arcus zygmaticus behind the porous acousticus and at the bottom by the processus mastoideus, the hinge being so constructed that said rear free end is resiliently pressed into said fossa.

4. A templet for spectacles, comprising a forward main portion, one end of which is provided with means for attaching it to a lens engaging means and the other end of which is adapted to extend backwardly over the ear of the wearer, and a short templet extension member connected by a hinge to the rear free end of said forward main portion, spring means in said hinge for biasing said extension member toward the head of the wearer, said extension member being of such a length that the free end thereof bears within the fossa which is limited at the top by the ear extension of the arcus zygmaticus behind the porous acousticus and at the bottom by the processus mastoideus.

5. A templet for spectacles as set forth in claim 1, so formed that the only point of contact with the head of the wearer is within said fossa.

PAUL HEMPEL.